United States Patent [19]
Sato et al.

[11] Patent Number: 5,813,491
[45] Date of Patent: Sep. 29, 1998

[54] UNDER BODY STRUCTURE OF MOTOR VEHICLE

[75] Inventors: Manabu Sato, Zushi; Yuji Sinpo, Hiratsuka; Masatoshi Aoki, Noshiro; Kenshi Funase, Hayato, all of Japan

[73] Assignee: Nissan Motor Co., Ltd., Kanagawa, Japan

[21] Appl. No.: 612,617

[22] Filed: Mar. 6, 1996

[30] Foreign Application Priority Data

Mar. 7, 1995 [JP] Japan ..................................... 7-046009

[51] Int. Cl.⁶ .................................................. B60K 13/04
[52] U.S. Cl. ........................ 180/309; 180/68.2; 180/69.1; 296/204
[58] Field of Search .................................. 180/309, 68.6, 180/69.1, 68.1, 68.2; 296/39.3, 204, 208

[56] References Cited

U.S. PATENT DOCUMENTS

| | | | |
|---|---|---|---|
| 1,816,161 | 7/1931 | Strauss ..................... | 180/68.1 |
| 4,909,530 | 3/1990 | Sukada et al. ........... | 180/69.1 |
| 5,195,607 | 3/1993 | Shimada et al. ......... | 180/309 |
| 5,490,572 | 2/1996 | Tajiri et al. .............. | 180/68.2 |
| 5,513,893 | 5/1996 | Nakata et al. ........... | 180/68.2 |

FOREIGN PATENT DOCUMENTS

| | | | |
|---|---|---|---|
| 2482548 | 11/1981 | France ..................................... | 296/204 |
| 58-211976 | 12/1983 | Japan ..................................... | 296/204 |
| 1-30889 | 2/1989 | Japan ..................................... | 296/204 |
| 1-47683 | 2/1989 | Japan ..................................... | 296/204 |
| 3-159864 | 7/1991 | Japan ..................................... | 180/309 |
| 5-97065 | 4/1993 | Japan ..................................... | 296/204 |
| 5-330457 | 12/1993 | Japan . | |

*Primary Examiner*—Brian L. Johnson
*Assistant Examiner*—Frank Vanaman
*Attorney, Agent, or Firm*—McDermott, Will & Emery

[57] ABSTRACT

In a motor vehicle having an engine mounted in an engine room, an exhaust tube system extending from the engine toward a rear end of the vehicle and a fuel tank positioned near the rear end of the vehicle, there is proposed an improved under body structure of the vehicle, by which the fuel tank is effectively cooled during running of the vehicle. The under body structure comprises an under cover positioned below the engine room. The under cover is formed with a longitudinally extending groove whose opening faces downward to contact a relatively low temperature air. A floor panel is formed with a longitudinally extending tunnel whose opening faces downward. The tunnel receives therein the exhaust tube system without contacting the same. A heat insulating plate extends in and along the tunnel in a manner to define in the tunnel an air flow passage which is insulated from the exhaust tube system. The air flow passage has a rear open end directed toward the fuel tank. A connecting duct is provided for connecting the groove of the under cover with the air flow passage defined in the tunnel of the floor panel.

26 Claims, 8 Drawing Sheets

UNDER BODY STRUCTURE OF MOTOR VEHICLE

BACKGROUND OF THE INVENTION

1. Field of the Invention

The present invention relates to a motor vehicle body, and more particularly to an under body structure of the motor vehicle, which is arranged to cool an exhaust system of the engine by positively producing a ventilation around the exhaust system.

2. Description of the Prior Art

In order to protect the front lower part of the body, most motor vehicles are equipped with an under cover at a position under the engine room. Usually, the under cover is so shaped and constructed as to provide a smoothed air flow between the lower portion of the engine room and the road surface for obtaining improved aerodynamic characteristics of the vehicle.

In this connection, some of under body structures of a motor vehicle are constructed to positively produce an enhanced ventilation under the vehicle body for effectively cooling functional parts, such as heated parts of the exhaust system, arranged below the floor panel of the vehicle. One of such under body structures is shown in Japanese Patent First Provisional Publication 5-330457.

However, even the under body structures of the above-mentioned have failed to exhibit a satisfied cooling effect particularly when a relatively high temperature air flowing over the under cover comes into the way of a relatively low temperature air which flows under the under cover toward the functional parts. For example, in case wherein the under body structure has a downwardly projected fuel tank at a rear portion of the floor panel, effective cooling of the fuel tank has not been expected because of a marked heat emitted from an exhaust tube which extends under the floor panel near the fuel tank.

SUMMARY OF THE INVENTION

It is therefore an object of the present invention to provide an under body structure of a motor vehicle, which is constructed to effectively cool the functional parts arranged at the rear portion of the floor panel.

According to the present invention, there is provided an under body structure of a motor vehicle which has an engine mounted in an engine room, an exhaust tube system extending from the engine toward a rear end of the vehicle and a functional part positioned near the rear end. The under body structure comprises an under cover positioned below the engine room, the under cover being formed with a longitudinally extending first groove whose opening faces downward to contact a relatively low temperature air; a floor panel formed with a longitudinally extending tunnel whose opening faces downward, the tunnel receiving therein the exhaust tube system without contacting the same; a first heat insulating plate extending in and along the tunnel in a manner to define in the tunnel a first air flow passage which is insulated from the exhaust tube system, the first air flow passage having a rear open end directed toward the functional part; and first connecting means for establishing a fluid connection between a rear open end of the first groove of the under cover and a front open end of the first air flow passage defined in the tunnel of the floor panel.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
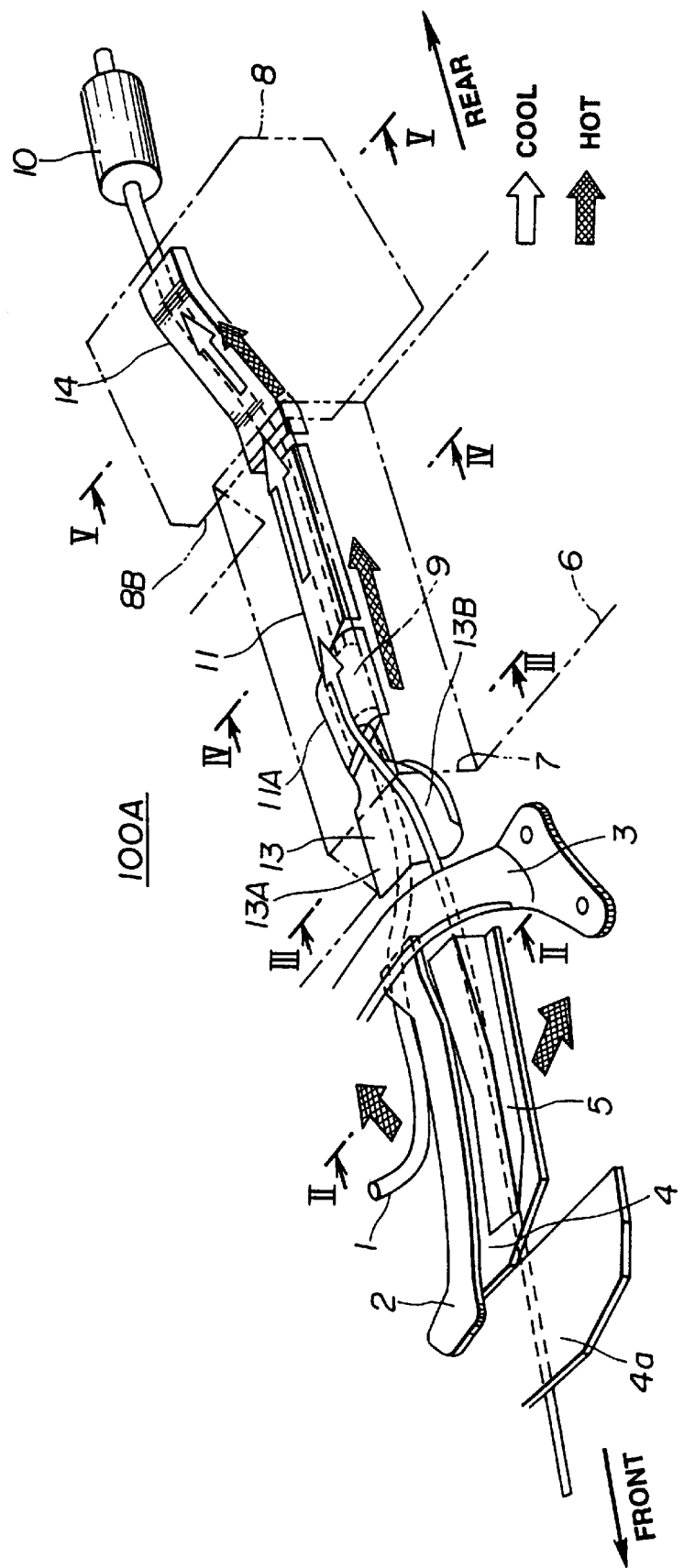
FIG. 1 is a perspective view of an under body structure of a motor vehicle, which is a first embodiment of the present invention.

Referring to FIGS. 1 to 5 of the drawings, particularly FIG. 1, there is shown an under body structure 100A which is a first embodiment of the present invention.

Figure 7:
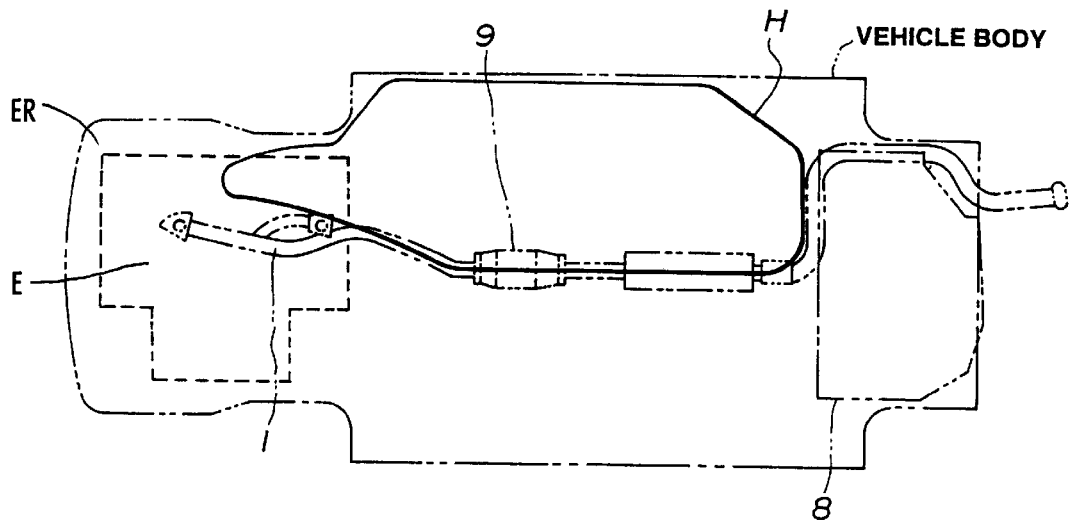
FIG. 7 is a sketch similar to that of FIG. 6, but showing a heat distribution provided by the under body structure of the first embodiment.

In FIG. 1, denoted by numeral 1 is an exhaust tube which extends longitudinally under a vehicle body. As shown in FIG. 7, an internal combustion engine E is mounted in a front part (viz., engine room) ER of the vehicle body, from which the exhaust tube 1 extends rearward.

Designated by numeral 2 is an elongate center member which is arranged longitudinally at a laterally middle portion of the vehicle body. The center member 2 has a front end fixed to a radiator core support (not shown) and a rear end fixed to a front suspension member 3 which extends transversely.

Under the center member 2, there is horizontally arranged an under cover 4 which protects the vehicle body from making a direct contact with the road surface and improves the aerodynamic characteristics of the vehicle. The under cover 4 is positioned below the engine. Designated by numeral 4a is a front under cover which is arranged under a front nose of the vehicle body.

Figure 2:
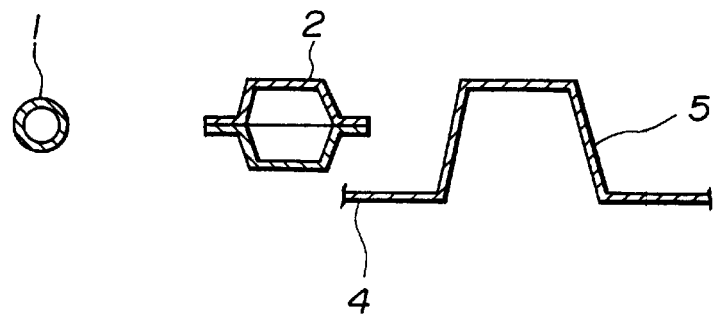
FIG. 2 is a sectional view taken along the line II—II of FIG. 1.

As is well shown in FIG. 2, beside the under cover 4, both the exhaust tube 1 and the center member 2 are arranged, which extend longitudinally. In the drawing, the exhaust tube 1 is positioned at a left side of the center member 2.

As is seen from FIGS. 1 and 2, the under cover 4 is formed with an upwardly depressed groove 5 which extends along the center member 2 and whose opening faces downward. As is understood from FIG. 1, the groove 5 extends from a front portion (not front edge) of the under cover 4 toward a rear end of the same, increasing the sectional area thereof as the distance from the front portion thereof increases.

Figure 3:
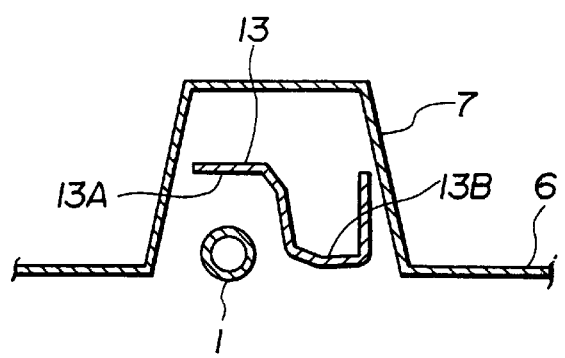
FIG. 3 is a sectional view taken along the line III—III of FIG. 1.

In FIGS. 1 and 3, designated by numeral 6 is a floor panel which is arranged behind the under cover 4. The floor panel 6 has a rear portion which is positioned higher than a front portion thereof. The floor panel 6 is formed with a longitudinally extending floor tunnel 7 whose opening faces downward.

A fuel tank 8 (see FIG. 1) is arranged in a depressed portion formed in a rear part of the floor panel 6. The arrangement of the fuel tank 8 will be easily understood when referring to FIG. 13.

As is understood from FIG. 1, the exhaust tube 1 from the engine extends along the center member 2 and then extends under the front suspension member 3 to enter the floor tunnel 7 of the floor panel 6. The exhaust tube 1 getting out of the floor tunnel 7 then extends under the fuel tank 8, as is seen from FIG. 5.

As is shown in FIG. 1, a catalytic converter 9 and a muffler 10 are mounted to given portions of the exhaust tube 1.

Figure 4:
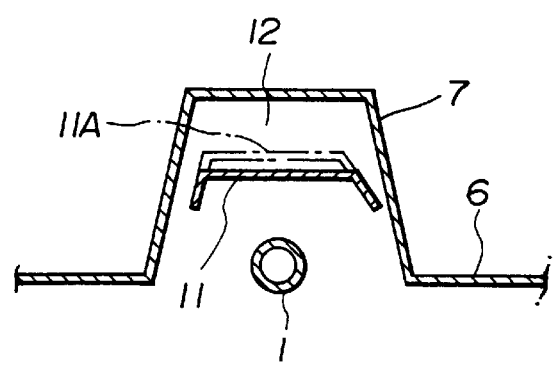
FIG. 4 is a sectional view taken along the line IV—IV of FIG. 1.

As is seen from FIG. 4, within the floor tunnel 7, there are installed first and second heat insulating plates 11 and 11A which are arranged in tandem. As shown in FIG. 1, the second heat insulating plate 11A is shaped and sized to cover the catalytic converter 9. Thus, the second insulating plate 11A is larger in size than the first insulating plate 11. Each heat insulating plate 11 or 11A is connected through suitable brackets (not shown) to walls of the floor tunnel 7. However, if desired, these heat insulating plates 11 and 11A may be directly connected to the walls by bolts, welding or the like.

As is seen from FIG. 4, due to provision of the heat insulating plate 11 or 11A, there is defined a so-called air flow passage 12 between the walls of the floor tunnel 7 and the heat insulating plate 11 or 11A.

As is understood from FIG. 1, between the floor panel 6 and the under cover 4, there is provided a connecting duct 13 through which the floor tunnel 7 and the groove 5 of the under cover 4 are connected. The connecting duct 13 is connected to the vehicle body through suitable brackets. Of course, if desired, the duct 13 may be directly connected to the vehicle body.

The connecting duct 13 has a rear extension which is inserted into the floor tunnel 7 and fixed to an upper surface of the second heat insulating plate 11A. The connecting duct 13 has a front portion which, as is seen from FIG. 3, comprises a cover portion 13A raised to cover the exhaust tube 1 from the above and a grooved portion 13B shaped to mate with the rear end of the groove 5 of the under cover 4. As is seen from FIG. 1, the bottom wall of the groove possessed by the grooved portion 13B is gradually raised as the distance from the front end thereof increases, and at the rear extension of the connecting duct 13, the groove disappears.

With the connecting duct 13 having the above-mentioned construction, the groove 5 of the under cover 4 and the air flow passage 12 defined in the floor tunnel 7 are communicated.

Figure 5:
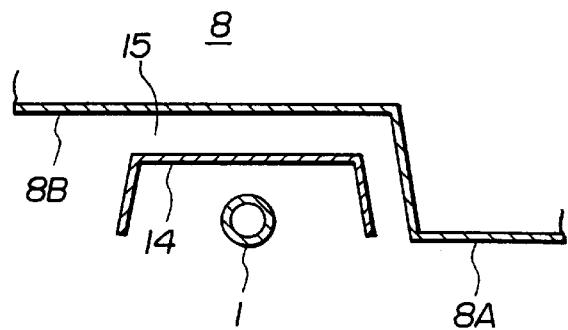
FIG. 5 is a sectional view taken along the line V—V of FIG. 1.

As is seen from FIGS. 1 and 5, the fuel tank 8 has a lower wall 8A formed with a longitudinally extending groove 8B in and along which the exhaust tube 1 extends toward the muffler 10. As is understood from FIG. 5, between the exhaust tube 1 and the upper wall of the groove 8B, there is installed a third heat insulating plate 14 which is connected to walls of the groove 8B through suitable brackets (not shown).

Due to provision of the third heat insulating plate 14, there is defined a so-called air flow passage 15 between the walls of the groove 8B and the heat insulating plate 14.

As is seen from FIG. 1, the third heat insulating plate 14 has a front end positioned near a rear end of the above-mentioned first heat insulating plate 11, so that the air flow passages 15 and 12 are communicated. If desired, the front end of the third heat insulating plate 14 and the rear end of the first insulating plate 11 may be connected through bolts, welding or the like.

As is understood from FIG. 1, the third heat insulating plate 14 has a front portion gradually curved upward to run in parallel with the exhaust tube 1.

With the under body structure having the above-mentioned construction, the following advantageous air flow is given to the associated motor vehicle particularly when the vehicle is under cruising.

As is indicated by blank arrows (or non-crosshatched arrows) in FIG. 1, when the motor vehicle runs forward, part of a relatively low temperature outside air around the front under cover 4a is forced to enter the groove 5 of the under cover 4. The air thus trapped by the groove 5 then enters through the connecting duct 13 the air flow passage 12 defined by the floor panel 6. Due to provision of the smoothly curved bottom of the grooved portion 13B of the connecting duct 13, the air is smoothly conveyed to the air flow passage 12. The air in the passage 12 is then conveyed to the air flow passage 15 defined by the lower wall 8A of the fuel tank 8, and finally discharged to the outside of the vehicle body from the rear end of the passage 15.

Due to provision of the connecting duct 13, and the first, second and third heat insulating plates 11, 11A and 14 which are arranged to have the above-mentioned heat insulating arrangement, the heat emitted from the exhaust tube 1 has substantially no effect on the temperature of the air which flows in the air flow passages, 13B, 12 and 15. That is, heat transfer from the exhaust tube 1 to the air flowing in the air flow passages is suppressed or at least minimized. More specifically, due to provision of the heat insulating members 13, 11A, 11 and 14, the relatively low temperature air directed toward the fuel tank 8 is not mixed with a relatively high temperature air which is produced by the exhaust tube 1. Thus, the fuel tank 8 is effectively cooled.

The paths of the hot air produced by the engine and the exhaust tube 1 are indicated by crosshatched arrows in FIG. 1. That is, under cruising of the vehicle, the hot air around the engine is discharged rearwardly sideward, and the hot air around the exhaust tube 1 is forced to flow under the heat insulating members 13, 11A, 11 and 14, as shown.

Because of the through construction of a longitudinally extending groove along which the exhaust tube 1 extends, the hot air produced by the exhaust tube 1 is quickly discharged to the outside from the rear end of the groove 8B of the fuel tank 8. This quick discharging of the hot air promotes the effective cooling of the fuel tank 8.

In order to examine the heat insulating performance of the under body structure of the first embodiment, a motor vehicle having the under body structure practically applied thereto was subjected to a heat distribution test wherein under the vehicle running at a speed of 9.4 Km/h, the zone of the temperature (viz., 65° C. or more) higher than the outside air temperature (viz., 35° C.) by 30° C. or more was plotted.

Figure 6:
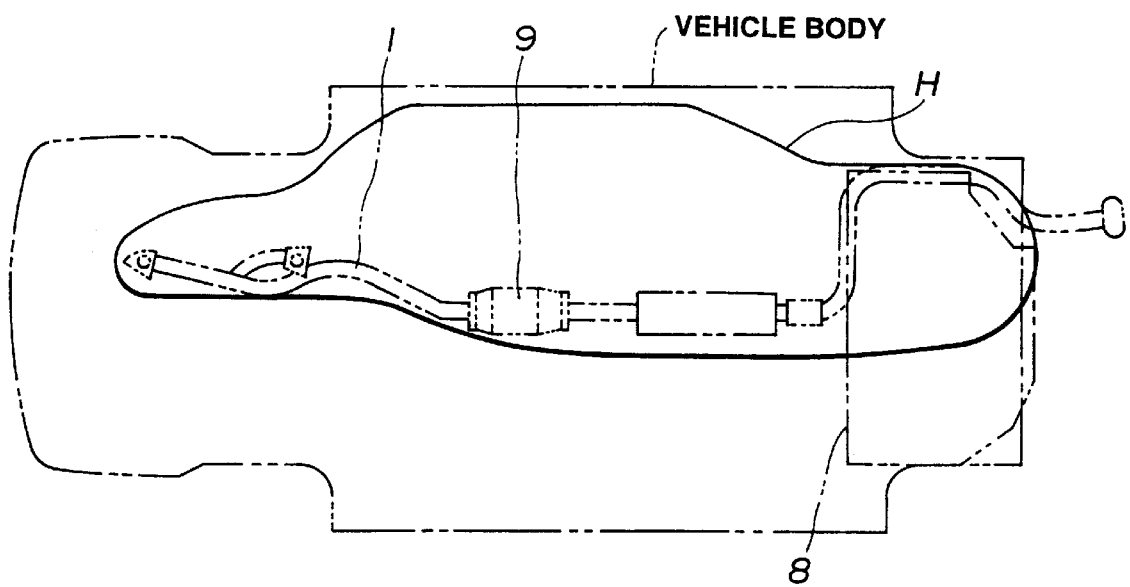
FIG. 6 is a sketch of a motor vehicle, showing a heat distribution provided by a conventional under body structure practically applied to the vehicle.

The result of the test is shown in FIG. 7. That is, the higher temperature zone is the zone enclosed by a solid line "H". For comparison, a test result in case of a conventional under body structure is shown in FIG. 6. As is seen from these drawings, the higher temperature zone of the invention was smaller than that of the conventional one. In particular, in the invention (see FIG. 7), the fuel tank 8 was not placed in the higher temperature zone "H", while, in the conventional structure (see FIG. 6), the fuel tank 8 was positioned at its large part in such higher temperature zone "H". In fact, in the test, the fuel tank 8 according to the invention showed a temperature lower than the conventional one by about 10° C.

As is described hereinabove, according to the invention, the fuel tank 8 can be effectively cooled. This suppresses a large production of fuel vapor in the fuel tank 8, and thus reduces the load of a carbon canister. That is, the capacity and thus the size of the carbon canister can be reduced.

Figure 8:
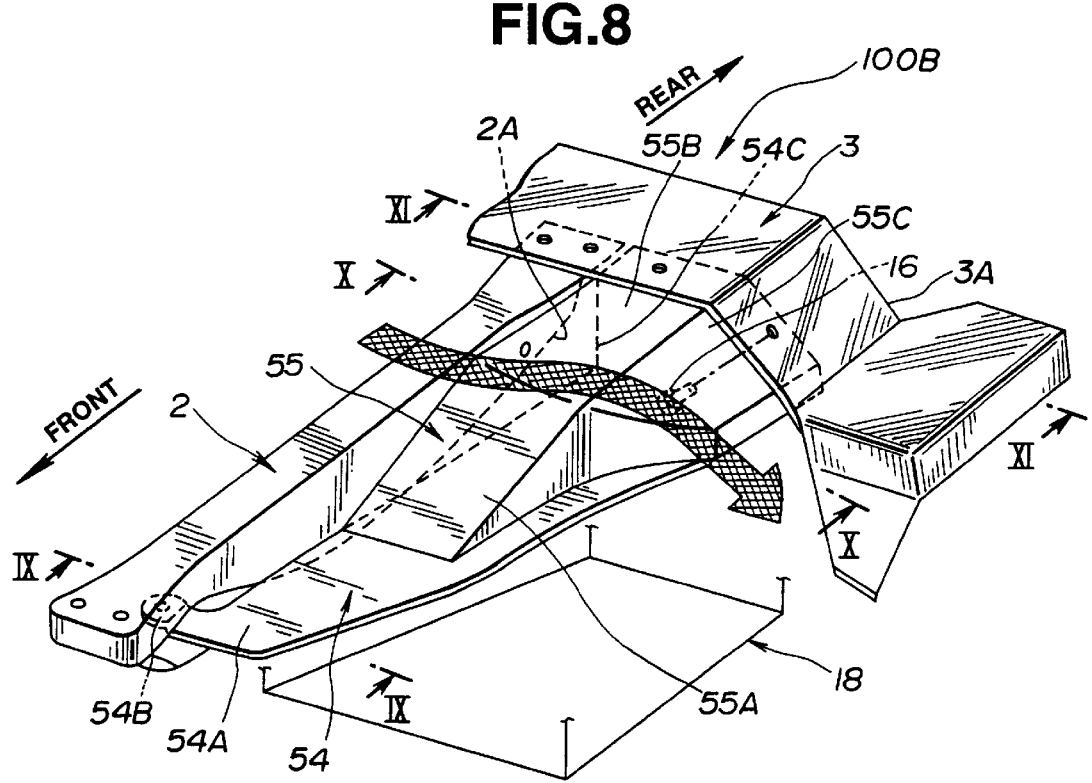
FIG. 8 is a perspective view of an essential portion of a second embodiment of the present invention.

Referring to FIGS. 8 to 11, particularly FIG. 8, there is shown, but partially, an under body structure 100B which is a second embodiment of the present invention.

Since the second embodiment 100B is similar in construction to the above-mentioned first embodiment 100A, only parts and constructions which are different from those of the first embodiment 100A will be described in detail in the following. Parts substantially the same as those of the first embodiment 100A will be denoted by the same numerals.

In the second embodiment, a modification is made to a front portion of the under body structure for effectively discharging the heated air in the engine room to the outside of the vehicle.

As is shown in FIG. 8, the rear end of the elongate center member 2 is bolted to a front lower surface of the front suspension member 3. With this, a generally L-shaped structure is constituted by the center member 2 and the front suspension member 3. Within a corner space defined by the L-shaped structure, there is arranged an under cover 54.

Figure 10:
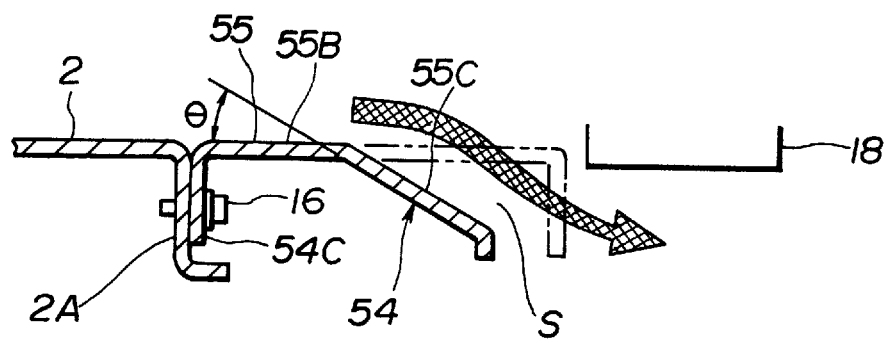
FIG. 10 is a sectional view taken along the line X—X of FIG. 8.

Designated by numeral 18 in FIGS. 8 and 10 is an oil pan of an automatic transmission mounted in the motor vehicle.

A front portion 54A of the under cover 54 has an inwardly extending bracket 54B which is secured through a bolt 16 (see FIG. 11) to a front lower surface of the center member 2.

Figure 11:
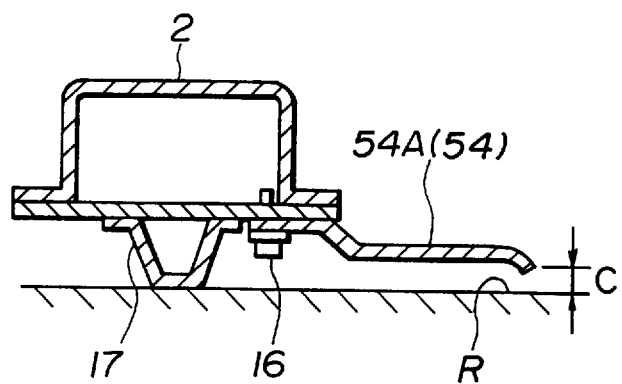
FIG. 11 is a sectional view taken along the line IX—IX of FIG. 8.

As is understood from FIG. 11, to the lower surface of the center member 2, there is fixed a protector 17 which has a generally V-shaped cross section. As shown, the protector 17 is projected downward beyond the under cover 54. Thus, even when, under cruising of the vehicle, the protector 17 is brought into abutment with the road surface "R", there is assuredly remained a certain clearance "C" between the road surface "R" and the under cover 54, which protects the under cover 54.

Referring back to FIG. 8, the under cover 54 is formed with an upwardly depressed groove 55 whose opening faces downward. As shown, the groove 55 extends from a longitudinally middle portion of the under cover 54 toward a rear end of the same, increasing the sectional area thereof as the distance from the front portion thereof increases. A wall defining a ceiling of the groove 55 is denoted by reference 55A. That is, the ceiling wall 55A is gradually raised with increase of the distance from the front end thereof. The ceiling wall 55A has a flat rear end 55B which is secured through a bolt 16 (see FIG. 9) to the lower surface of the front suspension member 3.

Figure 9:
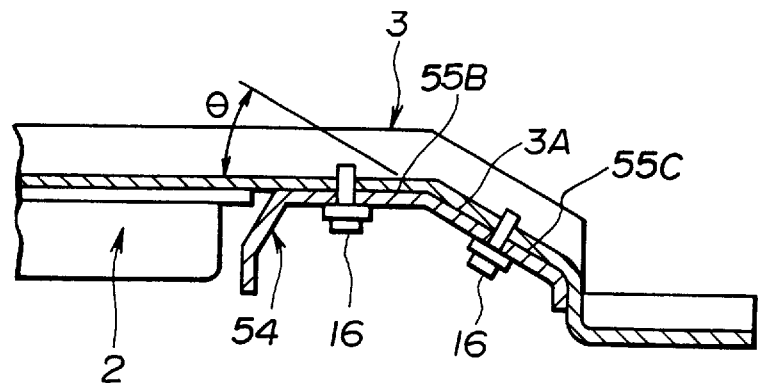
FIG. 9 is a sectional view taken along the line XI—XI of FIG. 8.

As is understood from FIGS. 8 and 9, an inclined side wall 55C (viz., outside side wall) extends laterally outward from a rear portion of the ceiling wall 55A. The inclination angle of the side wall 55C relative to the flat rear end portion 55B is designated by "θ" in FIG. 9. A rear end of the inclined side wall 55C is secured through a bolt 16 to an inclined part 3A of the front suspension member 3.

As is seen from FIG. 10, the inclination angle "θ" of the inclined side wall 55C is so determined as to define a certain clearance "S" between the side wall 55C and the oil pan 18 of the automatic transmission.

As is understood from FIGS. 8 and 10, an inside side wall 54C of the under cover 4, which defines a left wall of the groove 55, is secured through a bolt 16 to a vertical wall 2A of the center member 2.

Briefly speaking, the under cover 54 covers the corner space defined by the above-mentioned L-shaped structure. With this, upper and lower spaces bounded by the under cover 54 are isolated from each other. Furthermore, an upwardly swelled rear portion, which is defined by the walls 55B, 55C and 54C, of the under cover 54 is neatly mated with and bolted to a correspondingly shaped portion of the front suspension member 3.

With the under body structure having the above-mentioned construction, the following advantages are obtained.

That is, as is indicated by crosshatched arrows in FIGS. 8 and 10, the heated air in the engine room is discharged to the outside of the vehicle while running on and over the center member 2 and the upwardly swelled portion (55B, 55C, 54C) of the under cover 54. During this running, the flow of the heated air is accelerated at the throttled clearance "S" (see FIG. 10) defined between the inclined side wall 55C and the oil pan 18 and thus the heated air is effectively discharged to the outside. This effective discharging will be easily understood when considering a case wherein a flat wall as shown by a phantom line is employed in place of the inclined side wall 55C.

Due to the flow of air near the oil pan 18, the oil pan 18 can be cooled. This is because under cruising of the vehicle, the temperature of the oil pan 18 is kept higher than that of the heated air in the engine room.

As is described in the above, in the second embodiment, the heated air in the engine room is much effectively discharged to the outside of the vehicle, so that the cooling effect to the fuel tank 8 is much increased. In the second embodiment, the mechanical strength of the under cover 54 is increased because of the secured connection with the front suspension member 3. Furthermore, relative positioning between the under cover 54 and the front suspension member 3 is facilitated because of a so-called male/female connection achieved therebetween.

Figure 12:
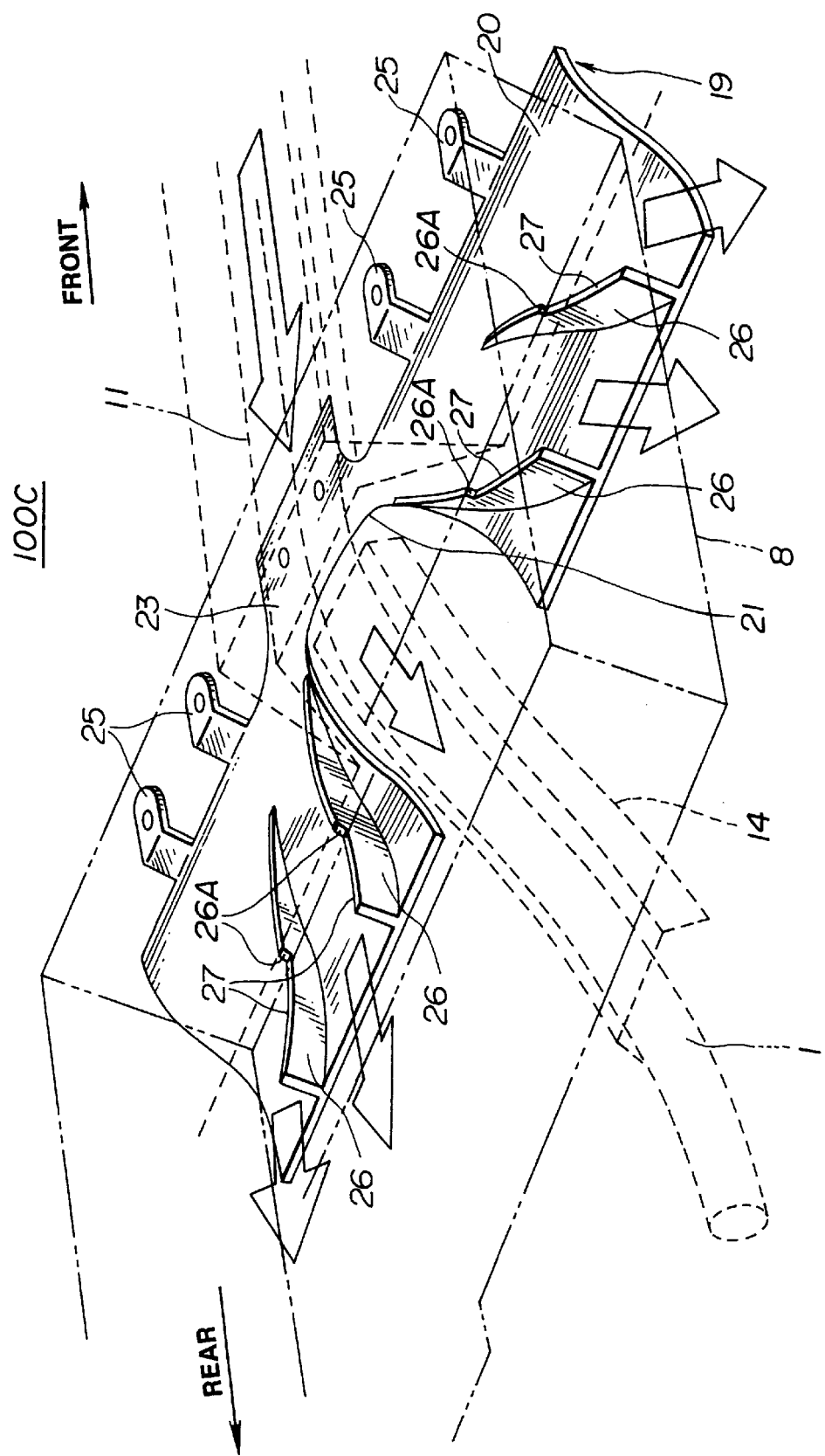
FIG. 12 is a perspective view of an essential portion of an under body structure of a third embodiment.
Figure 13:
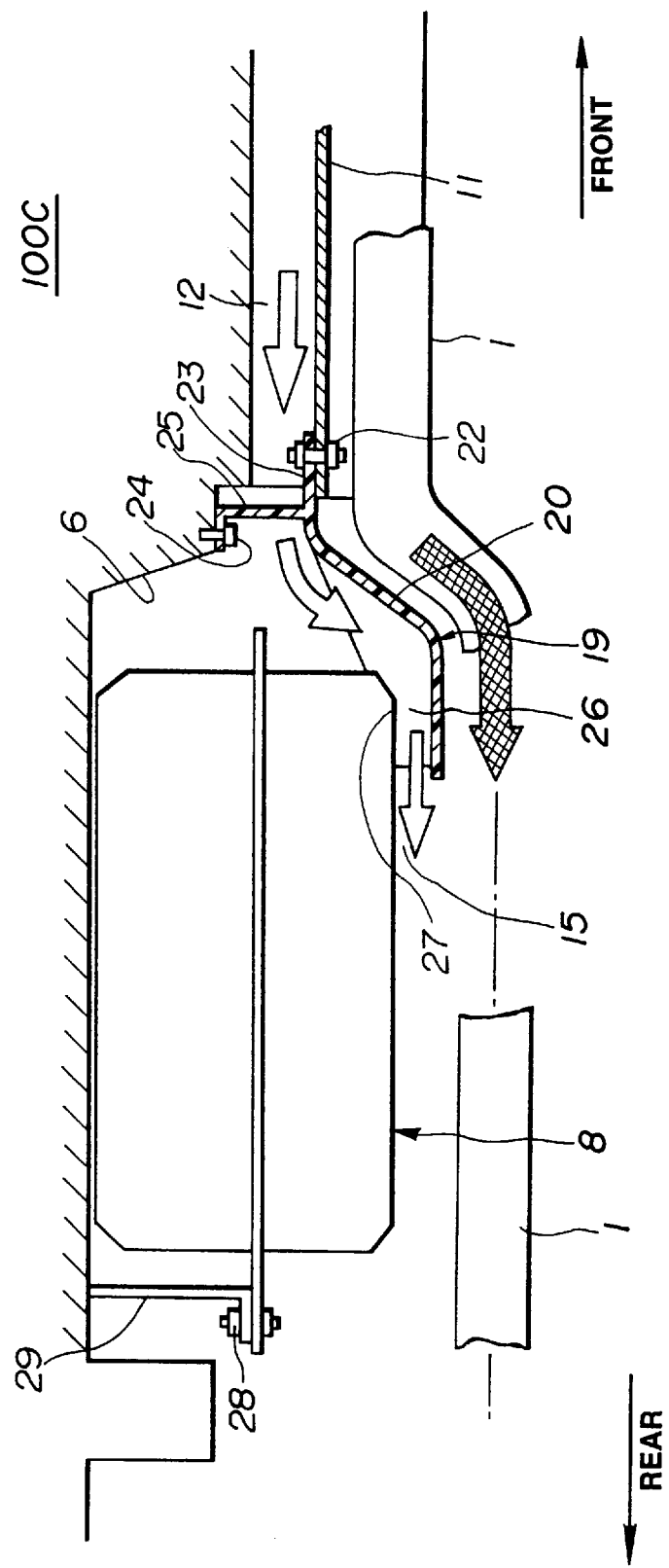
FIG. 13 is a side view of the under body structure of the third embodiment.

Referring to FIGS. 12 and 13, there is shown but partially an under body structure 100C which is a third embodiment of the present invention. It is to be noted that the drawings of FIGS. 12 and 13 have a reversed orientation with respect to FIG. 1. That is, the right side of the drawings is directed toward the front portion of the associated motor vehicle, and the left side of the drawing is directed toward the rear portion of the vehicle.

Since the third embodiment 100C is similar in construction to the above-mentioned first embodiment 100A, only parts and construction which are different from those of the first embodiment 100A will be described in detail in the following.

In the third embodiment 100C, a modification is made to a rear portion of the under body structure for much more effectively cooling the fuel tank 8 by using the relatively low temperature air which comes from the groove 5 of the under cover 4 (see FIG. 1).

As is seen from FIG. 13, an air guide structure 19 is disposed between the first insulating plate 11 arranged in the floor tunnel 7 of the floor panel 6 and the third heat insulating plate 14 arranged in the groove 8B of the fuel tank 8. A rear portion of the fuel tank 8 is supported by brackets 29 hanging from the floor panel 6. Bolts and nuts 28 are employed for connecting the fuel tank 8 to the brackets 29 as shown.

The air guide structure 19 comprises a gently curved plate member 20 which is elongated in lateral directions as is seen from FIG. 12. The plate member 20 has at its front center portion a flat flange 23 which is secured through bolts 22 (see FIG. 13) to the rear end of the first heat insulating plate 11. The front portion of the plate member 20 has further two pairs of raised brackets 25 at both sides of the flat flange 23, which are secured to the floor panel 6 through bolts 24 (see FIG. 13).

As is seen from FIG. 12, the plate member 20 is formed at a laterally middle portion thereof with a rectangular cut 21 whose opening is directed toward the air flow passage 15 of the groove 8B of the fuel tank 8. Thus, as is understood from FIG. 13, at least a part of the relatively low temperature air coming from the air flow passage 12 and running on the flat flange 23 enters the air flow passage 15 of the fuel tank 8 through the rectangular cut 21. With this air flow, the laterally middle portion of the lower wall 8A of the fuel tank 8 is cooled.

The plate member 20 has further two pairs of vanes (or air guide walls) 26 at both sides of the rectangular cut 21. As shown in FIG. 12, these vanes 26 extend gradually outward with increase of the distance from the center flat flange 23.

Each vane 26 is formed with a stepped portion remaining a holding portion 27 on which a front lower edge of the fuel tank 8 is stably seated as is understood from FIG. 13. Thus, remaining part of the relatively low temperature air coming from the air flow passage 12 is forced to flow through passages defined by the adjacent vanes 26. With this air flow, the laterally side portions of the lower wall 8A of the fuel tank 8 are cooled.

As is seen from FIG. 13, due to provision of the air guide structure 19 having the above-mentioned construction, the heated air around the exhaust tube 1, whose flow is indicated by a crosshatched arrow, is suppressed from contacting the fuel tank 8, and the relatively low temperature air from the air flow passage 12, whose flow is indicated by three blank arrows, is forced to contact substantially entire area of the lower surface 8A of the fuel tank 8. Thus, cooling of the fuel tank 8 is effectively achieved.

Because the air guide structure 19 is constructed to support the front portion of the fuel tank 8 in the above-mentioned manner, there is no need of providing a separate supporting member for that purpose. Furthermore, since each vane 26 of the air guide structure 19 has at the holding portion 27 a stepped or raised portion 26A against which the front lower edge of the fuel tank 8 abuts upon seating thereof on the holding portion 27, the fuel tank 8 can be stably supported by the air guide structure 19. Of course, the raised portion 26A can serve as a positioning means.

Due to provision of the smoothly curved air guide structure 19 between the floor panel 6 and the fuel tank 8, undesired turbulence air flow, which would be caused by a gap therebetween, is minimized, and thus, the air resistance to the motor vehicle is reduced correspondingly. Furthermore, due to provision of the air guide structure 19, the front lower portion of the fuel tank 8 is protected from directly contacting a road surface.

Figure 14:
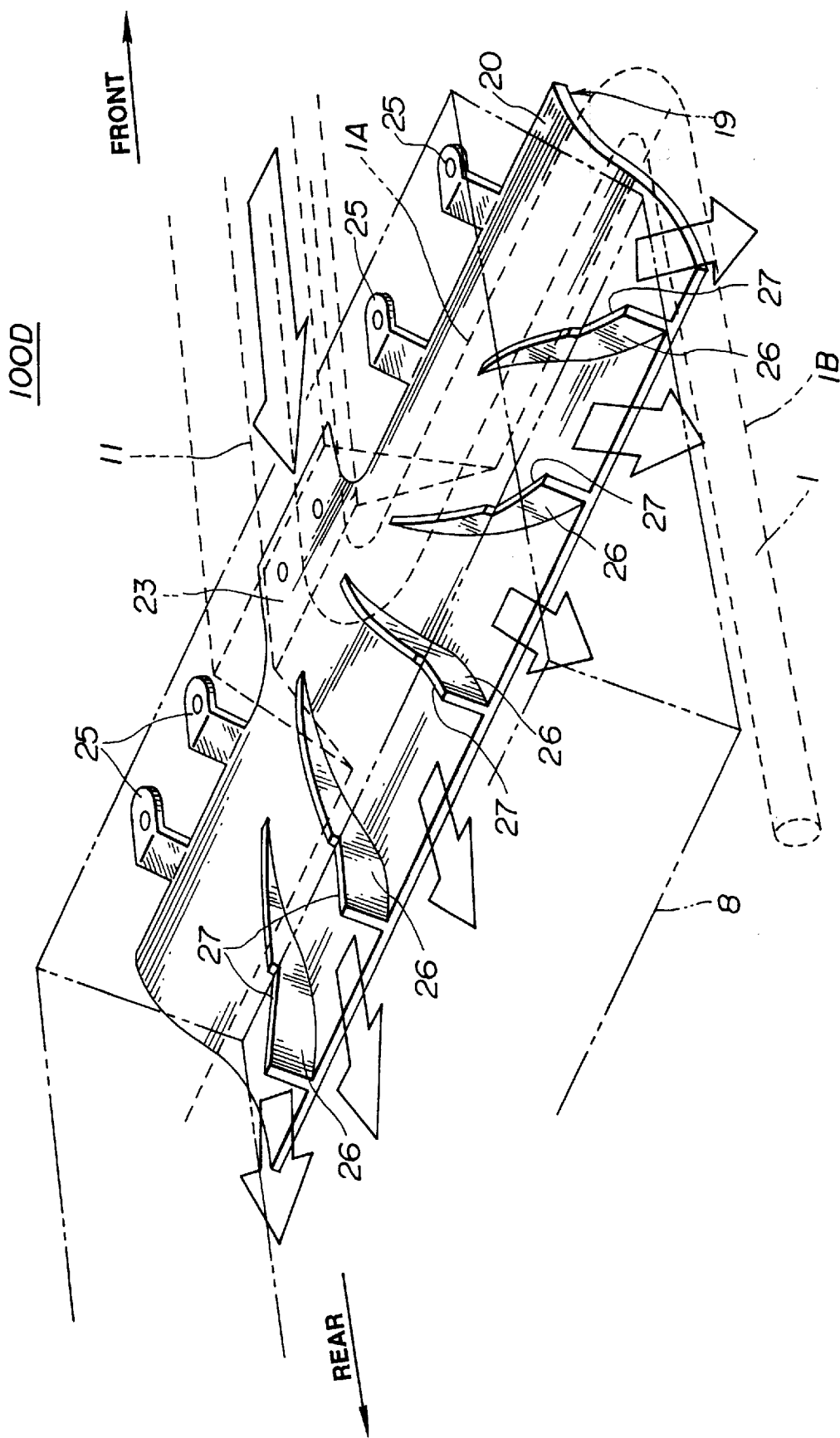
FIG. 14 is a view similar to FIG. 12, but showing a fourth embodiment.

Referring to FIG. 14, there is shown but partially an under body structure 100D which is a fourth embodiment of the present invention.

Since this embodiment 100D is similar to the above-mentioned third embodiment 100C, only parts and constructions different from those of the third embodiment 100C will be described in detail in the following.

That is, as is shown in FIG. 14, in the fourth embodiment 100D, the exhaust tube 1 from the floor tunnel 7 is sharply bent sideward at the front position of the fuel tank 8 in a manner to avoid the fuel tank 8. The plate member 20 of this fourth embodiment 100D has no means corresponding to the rectangular cut 21 (see FIG. 12) and the third heat insulating plate 14 (see FIG. 12) which are possessed by the third embodiment 100C. The plate member 20 is formed with five vanes 26 as shown.

Because the exhaust tube 1 is kept away from the fuel tank 8, the fuel tank cooling effect is much promoted. In fact, as is seen from FIG. 14, the laterally extending part 1A of the exhaust tube 1 is fully shield by the plate member 20, and the rearwardly extending part 1B of the same is cooled by the relatively low temperature air coming from the passages defined by the vanes 26.

Because the plate member 20 has no cut portion corresponding to the rectangular cut 21 of the third embodiment 100C, suppression of the undesired turbulence air flow is much assured.

What is claimed is:

1. An under body structure of a motor vehicle having an engine mounted in an engine room, an exhaust tube system extending from said engine toward a rear end of the vehicle and a functional part positioned near said rear end, said under body structure comprising:

an under cover positioned below said engine room, said under cover being formed with a longitudinally extending first groove whose opening faces downward to contact a relatively low temperature air;

a floor panel formed with a longitudinally extending tunnel whose opening faces downward, said tunnel receiving therein said exhaust tube system such that said exhaust tube system is spaced apart from said tunnel;

a first heat insulating plate extending in and along said tunnel in a manner to define in the tunnel a first air flow passage which is insulated from said exhaust tube system said first air flow passage having a rear open end directed toward said functional part; and first connecting means for establishing a fluid connection between a rear open end of the first groove of said under cover and a front open end of said first air flow passage defined in the tunnel of said floor panel.

2. An under body structure as claimed in claim 1, in which said under cover is positioned below an upstream part of said exhaust tube system.

3. An under body structure as claimed in claim 2, further comprising:

an elongate center member to which said under cover is secured; and a protector secured to a lower surface of said center member, said protector being so sized and constructed as to protect the under cover from contacting a road surface even when the protector is brought into abutment with the road surface.

4. An under body structure as claimed in claim 1, in which said functional part is a fuel tank positioned below a rear end portion of said floor panel.

5. An under body structure as claimed in claim 4, further comprising an air guide structure arranged between said floor panel and said fuel tank to guide the relatively low temperature air flowing from the rear open end of said first air flow passage to various external portions of said fuel tank.

6. An under body structure as claimed in claim 5, in which said air guide structure comprises:
- a gently curved plate member supported by said floor panel and having a front portion secured to said first heat insulating plate; and
- a plurality of spaced vanes raised from said plate member, every adjacent two of said vanes defining therebetween a fuel tank air flow passage through which the relatively low temperature air from said first air flow passage flows toward the various external portions of said fuel tank.

7. An under body structure as claimed in claim 6, in which each of said vanes is formed with a holding portion on which a front lower edge of said fuel tank is seated.

8. An under body structure as claimed in claim 4, further comprising:
- means for defining on a lower wall of said fuel tank a longitudinally extending second groove whose opening faces downward, said second groove receiving therein said exhaust tube system and spaced apart from said exhaust tube system;
- a second heat insulating plate extending in and along said second groove in a manner to define in said second groove a second air flow passage which is insulated from said exhaust tube system; and
- second connecting means for making a fluid connection between the rear open end of said first air flow passage and a front open end of said second air flow passage.

9. An under body structure as claimed in claim 8, in which said second connecting means is an air guide structure which is constructed to guide a part of the relatively low temperature air coming from said first air flow passage to external portions of the fuel tank other than said second air flow passage.

10. An under body structure as claimed in claim 9, in which said air guide structure comprises:
- a gently curved plate member supported by said floor panel and having a front portion secured to said first heat insulating plate;
- a plurality of spaced vanes raised from said plate member, every adjacent two of said vanes defining therebetween a third air flow passage through which a part of the relatively low temperature air from said first flow passage flows toward the external portions of said fuel tank; and
- means for defining in said plate member a cut through which the remaining part of the relatively low temperature air from said first flow passage flows toward second air flow passage defined on the lower wall of said fuel tank.

11. An under body structure as claimed in claim 1, in which said first heat insulating plate is divided into upstream and downstream parts, said upstream part being sized and constructed to cover a catalytic converter disposed on the exhaust tube system.

12. An under body structure as claimed in claim 11, in which said first connecting means is a connecting duct which comprises:
- a rear part inserted into the tunnel of the floor panel and fixed to said upstream part of said first heat insulating plate; and
- a front part including a cover portion raised to cover the exhaust tube system from above and a grooved portion shaped to mate with the rear open end of said first groove of the under cover.

13. An under body structure as claimed in claim 12, in which the groove possessed by the grooved portion of said connecting duct has a bottom wall which is gradually raised as the distance from the front end of the connecting duct increases.

14. An under body structure as claimed in claim 1, in which said first groove is defined by an upwardly swelled portion formed on said under cover, said swelled portion having an angular rear portion neatly mated with and secured to an angular portion of a front suspension member of the vehicle.

15. An under body structure as claimed in claim 14, in which an outside wall of said upwardly swelled portion of said under cover is inclined to define a certain space between the outside wall and an oil pan of an automatic transmission mounted on the vehicle.

16. An under body structure as claimed in claim 1, in which the sectional area of said first groove of said under cover gradually increases as the distance from the front end thereof increases.

17. In a motor vehicle having an engine mounted in an engine room, an exhaust tube system extending from said engine toward a rear end of the vehicle and a fuel tank positioned near said rear end,
an under body structure comprising:
- an under cover positioned below said engine room, said under cover being formed with a longitudinally extending first groove whose opening faces downward to contact a relatively low temperature air;
- a floor panel formed with a longitudinally extending tunnel whose opening faces downward, said tunnel receiving therein said exhaust tube system such that said exhaust tube system is spaced apart from said tunnel;
- a first heat insulating plate extending in and along said tunnel in a manner to define in said tunnel a first air flow passage which is insulated from said exhaust tube system, said first air flow passage having a rear open end directed toward said fuel tank;
- means for defining on a lower wall of said fuel tank a longitudinally extending second groove whose opening faces downward, said second groove receiving therein said exhaust tube system such that said exhaust tube system is spaced apart from said second groove;
- a second heat insulating plate extending in and along said second groove in a manner to define in said second groove a second air flow passage which is insulated from said exhaust tube;
- means for fluidly connecting a rear open end of the first groove of said under cover with a front open end of said first air flow passage defined in the tunnel of said floor panel; and
- means for fluidly connecting the rear open end of said first air flow passage with a front open end of said second air flow passage.

18. An under body structure as claimed in claim 17, further comprising:
- a longitudinally extending center member;
- a transversely extending front suspension member; and
- means for uniting said center member and said front suspension member to constitute a generally L-shaped structure which leaves a corner space within which said under cover is arranged in a manner to cover the corner space.

19. An under body structure as claimed in claim 18, in which said first groove is defined by an upwardly swelled portion of said under cover, said swelled portion having an angular rear portion which is bolted to an angularly bent portion of said front suspension member.

20. In a motor vehicle having an engine mounted in an engine room, an exhaust tube system extending from said engine toward a rear end of the vehicle and a fuel tank positioned near said rear end, an under body structure comprising:
- an under cover positioned below said engine room said under cover being formed with a longitudinally extending first groove whose opening faces downward to contact a relatively low temperature air;
- a floor panel formed with a longitudinally extending tunnel whose opening faces downward, said tunnel receiving therein said exhaust tube system such that said exhaust tube system is spaced apart from said tunnel;
- a first heat insulating plate extending in and along said tunnel in a manner to define in said tunnel a first air flow passage which is insulated from said exhaust tube system; and
- an air guide structure arranged between said floor panel and said fuel tank to guide a relatively low temperature air coming from said first air flow passage to various external portions of said fuel tank.

21. An under body structure as claimed in claim 20, further comprising:
- means for defining on a lower wall of said fuel tank a longitudinally extending second groove whose opening faces downward, said second groove receiving therein said exhaust tube system such that said exhaust tube system is spaced apart from said second groove;
- a second heat insulating plate extending in and along said second groove in a manner to define in said second groove a second air flow passage which is insulated from said exhaust tube; and
- means for defining in said air guide structure an opening through which a part of the relatively low temperature air coming from said first air flow passage flows into said second air flow passage.

22. In a motor vehicle having an engine mounted in an engine room, an exhaust tube extending between said engine room and a rear portion of the vehicle and a fuel tank positioned at the rear portion;

an under body structure comprising:
- an under cover positioned below said engine room, having a longitudinal, upward swelling portion defining a first groove with a downward facing opening for receiving cooling air;
- a floor panel having a longitudinally extending tunnel whose opening faces downward, said tunnel housing therein said exhaust tube spaced from said tunnel; and
- a first heat insulating plate disposed in and extending substantially over the entire length of said tunnel in a manner to define, in cooperation with said tunnel, a first air flow passage for guiding the cooling air, said first flow passage having a front end and a rear end, wherein said first groove of the under cover is in fluid communication with said front end and said rear end opens toward the fuel tank to direct the cooling air toward the fuel tank.

23. An under body structure as claimed in claim 22, further comprising:
- a second heat insulating plate longitudinally extending between a lower wall of said fuel tank and said exhaust system thereby defining a second air flow passage formed between the lower wall and the second insulating plate;
- wherein said second air flow passage is in fluid communication with said first air flow passage.

24. An under body structure as claimed in claim 23, further comprising:
- a longitudinally extending center member;
- a transversely extending front suspension member; and
- means for uniting said center member and said front suspension member to constitute a generally L-shaped structure which leaves a corner space within which said under cover is arranged in a manner to cover the corner space.

25. An under body structure as claimed in claim 24, in which said first groove is defined by an upwardly swelled portion of said under cover, said swelled portion having an angular rear portion which is bolted to an angularly bent portion of said front suspension member.

26. An under body structure as claimed in claim 25, wherein said upward swelled portion is of generally trapezoidal cross section and has a ceiling wall and a pair of side walls connected to the ceiling wall, wherein said trapezoidal cross section gradually expands its sectional area with the increase in distance from the front end of the under cover so as to direct an air flow impinging thereon in a transverse direction of the vehicle.

* * * * *